United States Patent [19]

Bonifay et al.

[11] Patent Number: 5,071,484

[45] Date of Patent: Dec. 10, 1991

[54] CEMENTITIOUS COMPOSITIONS AND METHOD

[75] Inventors: Wesley E. Bonifay, San Antonio; John G. Wheeler, Pipe Creek; Jose G. Garcia, San Antonio, all of Tex.

[73] Assignee: Capitol Aggregates, Inc., San Antonio, Tex.

[21] Appl. No.: 582,670

[22] Filed: Sep. 14, 1990

[51] Int. Cl.$^5$ .......................... C04B 7/04; C04B 7/32

[52] U.S. Cl. .................... 106/692; 106/693; 106/695; 106/715; 106/757; 106/765; 106/772; 106/784

[58] Field of Search .............. 106/692, 693, 695, 715, 106/757, 765, 784, 787, 756, 713, 772

[56] References Cited

U.S. PATENT DOCUMENTS

| | | |
|---|---|---|
| 1,592,343 | 7/1926 | Church . |
| 1,737,904 | 12/1929 | Witte . |
| 1,943,817 | 1/1934 | Dunton . |
| 2,006,386 | 7/1935 | Durbin et al. . |
| 2,042,833 | 6/1936 | Durbin . |
| 2,214,715 | 9/1940 | Breerwood . |
| 2,214,716 | 9/1940 | Breerwood . |
| 2,288,179 | 6/1942 | Breerwood . |
| 2,424,746 | 7/1947 | Downes . |
| 3,013,786 | 12/1961 | Pyzel . |
| 3,239,472 | 3/1966 | De Lisle . |
| 3,305,375 | 2/1967 | Jakacki . |
| 3,507,644 | 4/1921 | Coyle . |
| 3,615,787 | 10/1971 | Teramoto et al. . |
| 3,638,400 | 2/1972 | Hellmann . |
| 3,645,750 | 2/1972 | Sadran . |
| 3,689,294 | 5/1972 | Braolder . |
| 3,859,104 | 1/1974 | Semchenko et al. . |
| 3,861,928 | 1/1975 | Slater et al. . |
| 3,954,556 | 5/1976 | Jackson et al. . |
| 3,992,217 | 11/1976 | Baudouin et al. . |
| 3,997,353 | 12/1976 | Chervenka, Jr. et al. . |
| 4,002,483 | 1/1977 | Daughtery et al. . |
| 4,002,484 | 1/1977 | Baudouin . |
| 4,012,264 | 3/1977 | Murray et al. . |
| 4,026,716 | 5/1977 | Urschell, III et al. . |
| 4,062,822 | 12/1977 | Lesage . |
| 4,069,063 | 1/1978 | Ball . |
| 4,081,287 | 3/1978 | Baudouin et al. . |
| 4,259,121 | 3/1981 | Mathieu .................... 106/693 |
| 4,619,702 | 10/1986 | Gartner ..................... 106/757 |
| 4,957,556 | 9/1990 | Kunbargi ................... 106/693 |
| 4,964,912 | 10/1990 | Okabayashi et al. ....... 106/715 |

FOREIGN PATENT DOCUMENTS 498272 10/1972 U.S.S.R. .
1154330 6/1969 United Kingdom .

OTHER PUBLICATIONS

Chemical Abstract—"Mutual Effect of 3 Calcium Oxide-Silicon Dioxide and 4 Calcium Oxide-Aluminum Oxide-Iron Oxide During Hydration of Portland Cement", Bobrov et al., *Gidratatsiya* Tverd. Tsem., vol. 2, Pt. 1, pp. 163–165 (1976).

*Primary Examiner*—William R. Dixon, Jr.
*Assistant Examiner*—Paul Marcantoni

[57] ABSTRACT

A cementitious composition capable of forming an early high strength cement when admixed with a liquid comprising a cementitious material of a specific chemical composition, surface area, and particle size distribution, the method of making such cementitious composition, and cements comprising said composition.

14 Claims, No Drawings

CEMENTITIOUS COMPOSITIONS AND METHOD

BACKGROUND OF THE INVENTION

The present invention is directed to pulverulent cementitious composition which can be used to form cements having high early strength as well as being cements of low permeability and high durability. The invention is particularly suitable for use in cementing operations involving wells in the oil and gas industry.

In using a cement, and often in certain types of cementing operations in the oil and gas industry, it is desired to have a cement which will rapidly give early high strength and/or which will have low fluid loss characteristics. In an effort to obtain ever better results, various materials such as chromium, chlorides, and the like have been included with the clinker normally used to form cements to increase the early high strength, and these additives are costly and often toxic or corrosive. Other materials, such as accelerators and plasticizers have also been added to the cement, but these have drawbacks of their own, not only in terms of cost but in terms of also being corrosive, toxic or polluting materials. For example, chloride-type accelerators, if used in cements which come into contact with metallic objects, such as the use of high early strength cements in sealing the annulus between the metal well casing and the bore hole of an oil and gas well, can act to corrode the casing.

Also, often such cements do not have a sufficiently small particle size to be utilized effectively in forming non-permeable building blocks or for squeeze cementing in oil, gas and other wells or which, regardless of particle size, do not perform satisfactorily without additives or additional processing steps. Squeeze or remedial cementing is the process of forcing a cement slurry into perforations, holes in the well casing, or cavities behind the well casing or liner. Such cementing is usually performed during the drilling and completion of a well, or in repairing or altering an already drilled well. Illustrative is the inability often to obtain the required primary cementing in squeeze cementing without first cleaning the area of the well to be cemented with water, a non-acid wash, or with an acid flush, regardless of the particle size of the cement. Also, in squeeze cementing, the cementitious material presently used does not have the low fluid loss characteristics desired.

Not only have the additive materials not given the desired results of the high early strength, but in compositions which do not utilize additives, but rely only on small particle size, satisfactory results cannot be obtained, and there is often noted irregular setting time for the cement. Such small particle size for the high early strength are shown in U.S. Pat. Nos. 3,239,472 and 4,160,674. As noted, small particle size alone does not give the desired results and often gives irregular setting times.

SUMMARY OF THE INVENTION

The instant invention overcomes the problems faced in trying to form high early strength cementitious compositions and provides cementitious compositions that are inexpensive and that will rapidly set to give high early strength and/or low fluid loss characteristics.

Briefly, the present invention comprises a cementitious composition capable of forming a high early strength cement when mixed with a liquid comprising a pulverulent cementitious material having a particle size distribution such that substantially all of its particles are of the size of about 10 microns or smaller and at least about 70% by weight of its particles are 5 microns or smaller and having a surface area of at least about 8,000 sq.cm/gm.(Blaine), and whose chemical composition comprises, for each 100 by weight thereof, at least about 60 % by weight tricalcium silicate, at least about 9% by weight tricalcium aluminate, at least about 4% by weight of tetracalcium aluminoferrate, no more than about 4% by weight dicalcium silicate and at least about 6% by weight of a calcium sulfate calculated as $SO_3$.

The invention also comprises the method of making such compositions and cements containing effective amounts of such compositions as hereafter described.

DETAILED DESCRIPTION

The instant invention requires as essentials a specified particle size distribution and surface area of the cementitious material and also a specific chemical composition.

The material itself comprises a clinker suitable for forming a hydraulic cement having the chemistries noted below with the addition of a calcium sulfate, preferably a gypsum.

With respect to the clinker, it can be any clinker which is utilized to form hydraulic cements whether they be Type I or III portland cements, or the like. What is important is the chemical composition of the clinker, the particle size distribution and surface area thereof and of the calcium sulfate.

The clinker must contain, for each 100% by weight thereof, at least about 65% by weight of tricalcium silicate ($C_3S$), at least about 10% by weight of tricalcium aluminate ($C_3A$), at least 7% by weight tetracalcium aluminoferrate ($C_4AF$), and no more than about 7% by weight of dicalcium silicate ($C_2S$). It is important to to ensure that the dicalcium silicate is kept below the level indicated to ensure the final composition does not contain more than 4% by weight thereof, and it is preferred that the $C_3S + C_3A$ concentration be at least about 75% by weight.

The other component of the composition is a calcium sulfate, and it is used preferably in an amount of about 3 to 7% by weight, calculated as $SO_3$, for each 100 parts by weight of the composition. Such calcium sulfate can be either hydrated or unhydrated, such as $CaSO_4$, $CaSO_4.2H_2O$, or mixtures thereof, and the like and for this purpose, gypsum and gypsum anhydrite can be used.

With respect to the ranges of the components of the composition, set forth below in Table I is the most desired operative range of the components thereof. This can be formed for example, by admixing 95 parts by weight of the clinker and 5 parts by weight of a gypsum or gypsum anhydrite.

TABLE I

|  | % by Weight |
| --- | --- |
| $C_3S$ | 60–75 |
| $C_3A$ | 9–11 |
| $C_2S$ | 0–4 |
| $C_4AF$ | 4–7 |
| $C_3S + C_3A$ | 70–80 |
| Calcium Sulfate (calculated as $SO_3$) | 3–8 |

It will be recognized that the degree of high early strength depends in some measure also on the amount of liquid, most usually water, that is utilized in forming the cement. With the instant invention, the normal range of water addition; i.e., about 40 48.5% by weight of the cementitious material, can be utilized to obtain optimum results.

As to particle size and surface area, all of the particles of the composition are preferably 10 microns or smaller with 70% by weight, and preferably 80%, of the particles being 5 microns or smaller, and most preferably, 35% by weight of the particles being 2 microns or smaller. In conjunction with the particle size distribution, the surface area of the composition must be at least about 8,000 sq.cm/gm.(Blaine) and, preferably, at least 10,000 sq.cm/gm.(Blaine). It is important that there be a distribution of particle sizes ranging from 10 microns to 1 micron and below and not particles of just a few micron sizes.

The composition is made by mixing various clinkers and gypsums to obtain the proper chemistry, then controlling the grinding to obtain the required particle size distribution and surface area and separating the properly sized composition. It will be evident that in such separation oversized particles can be recycled to be reground to the proper size and distribution.

The method comprises preferably selecting a Type I or Type III portland cement clinker with the proper chemistry or forming a clinker with the proper chemistry as discussed above and admixing it with the proper proportion of a gypsum or a gypsum anhydrite to give the proper $SO_3$ concentration.

This mixture, or feed, is fed into a mill and ground. For this purpose, any finish mill presently used in milling cement clinker is utilized. However, to ensure that the maximum percentage of composition of the desired particle size distribution and surface area will be obtained in a single pass through the mill (thus minimizing the amount of coarser particles that need to be recycled and unsuitable particle size distribution) it is preferred to use a ball mill divided into sections, as is conventional, but to utilize in the final section of the mill prior to discharge, balls of various diameters to ensure that the desired particle size distribution and surface area desired.

The mill discharge is then conveyed to a separator where the properly sized particles are recovered and the coarser particles are recycled to the mill together with fresh feed. It will be evident that the size of the separator and/or number of separators used is calculated to satisfactorily process the amount of mill discharge feed. While any conventional separating means can be utilized, it is preferred to use high efficiency air separators adjusted so as to recover particles of the desired size.

Also, while the method can be carried out in batch, it is preferred to carry out the method continuously with fresh feed being continuously added to the mill, the mill discharge being continuously fed to the separator(s), and the desired product continuously recovered therefrom with the coarser particles being continuously recycled to the mill.

The resultant dry composition is admixed with water or other suitable liquid to form a suitable cement. It can also be admixed with sand and/or aggregates as is conventional with cements used for certain purposes. Also, although the composition does not require the same, if desired, accelerators or retarders can be added in their usual amounts for their usual purposes.

The instant cementitious composition can be utilized in any environment where early high strength is desired and/or where cements with low fluid loss characteristics are desired and provides a cementing composition that has low permeability, high durability and corrosion resistance, and that is non-polluting.

The invention will be further described in connection with the following examples which are set forth for purposes of illustration only.

EXAMPLE 1

A dry cementitious composition was prepared from a mix of 95 parts by weight of a Type I portland cement clinker and 5 parts by weight of a gypsum and had particle size distribution (measured by the SEDIGRAPH 5,000 D) such that 100% by weight of the particles were 10 microns or smaller, 88% by weight of the particles were 5 microns or smaller, and 37% by weight of the particles were 2 microns or smaller. The Blaine fineness of the composition was 10,686 sq.cm/gm.

The composition had the following chemistry:

|  | % by Weight |
|---|---|
| $C_3S$ | 61.8 |
| $C_2S$ | 3.3 |
| $C_3A$ | 9.8 |
| $C_4AF$ | 5.4 |
| $C_3S + C_3A$ | 71.6 |
| CaO | 61.95 |
| $SiO_2$ | 17.70 |
| $Al_2O_3$ | 4.82 |
| $Fe_2O_3$ | 1.79 |
| MgO | 1.35 |
| $K_2O$ | 1.28 |
| $Na_2O$ | 0.22 |
| $SO_3$ | 7.39 |
| Trace Materials | 0.40 |
| L.O.I. | 3.10 |

More particularly, the composition was formed by admixing the noted proportions of clinker and gypsum, feeding such mixture into a mill, and then feeding the mill discharge into a high efficiency air separator operated so as to separate 10 microns and smaller particles from coarser particles. The coarser particles are then fed into the mill with fresh feed for regrinding.

The resultant composition was tested for compressive strength in accordance with ASTM Test C109. More particularly, water and sand were admixed with the dry cementitious composition, in values relative to the weight of the cementitious composition, of, respectively, 48.5% by weight 2.75 times the weight. The mixture was allowed to harden at 72° F., and 100% humidity and the compressive strength measured at 8, 16, and 24 hours. The results were as follows:

| Time (hrs.) | Compressive Strength (psi) |
|---|---|
| 8 | 5005 |
| 16 | 7800 |
| 24 | 8475 |

EXAMPLE 2

A cementitious composition was formed as in Example 1, except that the composition had a Blaine fineness of 10,231 sq.cm/gm. and following particle size distribution and chemistry:

| A. Particle size distribution | |
|---|---|
| Micron Size | % Passing |
| 10 | 100 |
| 5 | 80 |
| 2 | 35 |
| B. Chemistry | |
| | % by Wt. |
| $C_3S$ | 66.1 |
| $C_2S$ | 0.0 |
| $C_3A$ | 10.1 |
| $C_4AF$ | 8.9 |
| $C_3S + C_3A$ | 76.2 |
| $CaO$ | 62.08 |
| $SiO_2$ | 16.30 |
| $Al_2O_3$ | 5.66 |
| $Fe_2O_3$ | 2.92 |
| $MgO$ | 0.61 |
| $K_2O$ | 1.82 |
| $Na_2O_3$ | 0.09 |
| $SO_3$ | 7.19 |
| Trace Materials | 0.42 |
| L.O.I. | 2.91 |

The compressive strength of the composition was tested as in Example 1 and the results were as follows:

| Time(hrs.) | Compressive Strength (psi) |
|---|---|
| 8 | 6170 |
| 16 | 7535 |
| 24 | 8170 |

EXAMPLES 3 and 4

These examples show that the proper composition chemistry, particle size and fineness are required to obtain the necessary high early strength.

Two compositions, (3 and 4) were formed as in Example 1 and their respective surface area (Blaine fineness) were 9,604 and 9,215 sq.cm/gm. Their respective particle size distribution and chemistry were as follows:

| | EXAMPLE 3 | EXAMPLE 4 |
|---|---|---|
| A. Particle size distribution | | |
| % Passing 10 microns | 100 | 100 |
| % Passing 5 microns | 80 | 80 |
| % Passing 2 microns | 30 | 28 |
| B. Chemistry | | |
| $C_3S$ | 59.2 | 63.9 |
| $C_2S$ | 3.9 | 2.1 |
| $C_3A$ | 8.7 | 8.8 |
| $C_4AF$ | 7.4 | 7.5 |
| $C_3S + C_3A$ | 67.9 | 72.7 |
| $CaO$ | 60.94 | 62.01 |
| $SiO_2$ | 16.94 | 17.54 |
| $Al_2O_3$ | 4.85 | 4.91 |
| $Fe_2O_3$ | 2.43 | 2.48 |
| $MgO$ | 1.27 | 0.87 |
| $K_2O$ | 1.48 | 1.66 |
| $Na_2O_3$ | 0.18 | 0.19 |
| $SO_3$ | 8.44 | 6.56 |
| Trace Materials | 0.36 | 0.47 |
| L.O.I. | 3.11 | 3.31 |

Each composition was tested as to compressive strength (in psi) as in Example 1 and the results were as follows:

| Time (hrs.) | EXAMPLE 3 | EXAMPLE 4 |
|---|---|---|
| 8 | 4250 | 5325 |
| 16 | 7405 | 6870 |
| 24 | 7545 | 7280 |

The foregoing results show that composition chemistry alone and particle size and surface area alone do not give the highest compressive strength. Rather, the unexpected increase in strength results from the combination of chemical composition, particle size distribution and surface area relationships.

The above results show that the higher the percentage of $C_3S+C_3A$ alone the higher the compressive strength at 8 hours, but this does not hold true for strengths at 16 and 24 hours.

The comparison of the results of Examples 3 and 4 shows that though the composition of Example 3 had the lowest $C_3S+C_3A$ composition, its strength results at 16 and 24 hours were better than that of the composition of Example 4 because of the composition of Example 3 has a higher surface area and a larger percentage of particles 2 microns and finer.

It will also be seen that the composition of Example 1 had the best results at 16 and 24 hours even though it did not have the highest $C_3S+C_3A$ concentration, but did have the highest surface area and largest number of particles below 5 and 2 microns.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A pulverulent cementitious composition capable of forming an early high strength cement when admixed with a liquid comprising a cementitious material having a particle size distribution such that substantially all of its particles are of a size of about 10 microns or smaller and at least about 70% by weight of its particles are 5 microns or smaller and having a surface area of at least about 8,000 sq.cm/gm. (Blaine) and whose chemical composition comprises, for each 100% by weight, at least about 60% by weight tricalcium silicate ($C_3S$), at least about 9% by weight tricalcium aluminate ($C_3A$), at least about 4% by weight tetracalcium aluminoferrate ($C_4AF$), no more than about 4% by weight dicalcium silicate ($C_2S$), and about 3 to 7% by weight of a calcium sulfate, calculated as $SO_3$.

2. The composition of claim 1 wherein the percentage of particles 5 microns or smaller is at least about 80% by weight, and the surface area is at least about 10,000 sq.cm/gm. (Blaine).

3. The composition of claim 1 or 2 wherein the particle size distribution is such that 100% by weight of the particles are 10 microns or smaller, at least 80% by weight of the particles are 5 microns or smaller, and at least 35% by weight of the particles are 2 microns or smaller.

4. The composition of claim 1 or 2 wherein said chemical composition comprises, for each 100 parts by weight,

|  | % by Wt. |
| --- | --- |
| $C_3S$ | 60–75 |
| $C_3A$ | 9–11 |
| $C_2S$ | 0–4 |
| $C_4AF$ | 4–7 |
| $C_3S + C_3A$ | 70–80 |
| Calcium Sulfate (calculated as $SO_3$) | 3–8. |

5. A pulverulent cementitious composition capable of forming an early high strength cement when admixed with water comprising a cementitious material having a particle size distribution such that 100% by weight of its particles are of a size of 10 microns or smaller, at least about 80% by weight of its particles are 5 microns or smaller, and at least about 35% by weight of its particles are 2 microns or smaller and having a surface area of at least about 10,000 sq.cm/gm (Blaine) and whose chemical composition consists essentially of, for each 100% by weight, at least about 60% by weight tricalcium silicate ($C_3S$), at least 9% by weight tricalcium aluminate ($C_3A$), at least about 5% tetracalcium aluminoferrate ($C_4AF$), no more than about 4% by weight dicalcium silicate ($C_2S$), and about 3 to 7% by weight of a calcium sulfate, calculated as $SO_3$, and wherein the total of $C_3S$ and $C_3A$ is about 70 to 80% by weight.

6. A cement comprising a fluid and the composition of any one of claims 1, 2, or 5.

7. The cement of claim 6 including a sand and/or aggregate.

8. The cement of claim 6 consisting essentially of water and the composition of any one of claims 1, 2 or 3.

9. A cement consisting of water and the composition of claim 5.

10. The method of making a pulverulent cementitious composition capable of forming an early high strength cement when admixed with a liquid comprising.

(a) admixing a cement clinker and a calcium sulfate, the proportions of said clinker and sulfate and chemical composition of such clinker being such that the mixture thereof comprises, for each 100% by weight thereof, at least about 60% by weight tricalcium silicate, at least about 9% by weight tricalcium aluminate, at least about 4% by weight tetracalcium aluminoferrate, no more than about 4% by weight dicalcium silicate, and about 3 to 7% by weight of a calcium sulfate, calculated as $SO_3$, (b) grinding said mixture for a time and under conditions such that a substantial portion has a particle size less than about 10 microns and a particle size distribution such that substantially all of its particles are of a size of about 10 microns or smaller and at least 70% by weight of its particles are 5 microns or smaller and such that the surface area of said portion is at least about 8,000 sq.cm/gm. (Blaine), and (c) separating said portion of the mixture having a particle size less than about 10 microns from the remainder of the mixture.

11. The method of claim 10 when the portion of the ground mixture having particles larger than about 10 microns is recycled to be reground.

12. The method of claim 11 wherein the method is continuous with the mixture being formed continuously, fed continuously to be ground, the ground material continuously separated to recover the portion whose particle size is less than about 10 microns, and the portion whose particle size is greater than about 10 microns continuously recycled to be reground.

13. The method of claim 12 wherein the grinding is carried out such that the particle size distribution of the portion having particles less than about 10 microns is such that 100% by weight of its particles are of a size of 10 microns or smaller and at least 80% by weight of its particles are 5 microns or smaller and the surface area of such portion is at least 10,000 sq.cm/gm.(Blaine).

14. The method of claim 13 wherein the grinding is carried out such that at least 35% by weight of the particles of said portion are 2 microns or smaller.

* * * * *

UNITED STATES PATENT AND TRADEMARK OFFICE
CERTIFICATE OF CORRECTION

PATENT NO. : 5,071,484
DATED : December 10, 1991
INVENTOR(S) : Wheeler, et al It is certified that error appears in the above-indentified patent and that said Letters Patent is hereby corrected as shown below:

ON THE TITLE PAGE
In Section 56, under References Cited, add the following as U.S. patent documents.

4,098,613 7/78 Maravilla et al 106/717
4,102,695 7/78 Clavarie
4,160,674 7/79 Sawyer Signed and Sealed this Eighth Day of June, 1993

Attest:

MICHAEL K. KIRK

Attesting Officer     Acting Commissioner of Patents and Trademarks